United States Patent [19]

Ou

[11] Patent Number: 5,102,464
[45] Date of Patent: Apr. 7, 1992

[54] VERMICULITE DISPERSIONS AND METHOD OF PREPARING SAME

[75] Inventor: Chia-Chih Ou, Lexington, Mass.

[73] Assignee: W. R. Grace & Co.-Conn., Cambridge, Mass.

[21] Appl. No.: 606,252

[22] Filed: Oct. 31, 1990

Related U.S. Application Data

[63] Continuation-in-part of Ser. No. 261,880, Oct. 24, 1988, abandoned, which is a continuation-in-part of Ser. No. 27,731, Mar. 19, 1987, Pat. No. 4,780,147, which is a continuation-in-part of Ser. No. 764,910, Aug. 12, 1985, Pat. No. 4,655,842.

[51] Int. Cl.$^5$ .............................................. C04B 14/20
[52] U.S. Cl. ...................................... 106/415; 106/416; 106/DIG. 3; 428/428; 428/454; 501/148
[58] Field of Search ................. 106/DIG. 3, 415, 416; 428/428, 454; 501/148

[56] References Cited

U.S. PATENT DOCUMENTS

| | | | |
|---|---|---|---|
| 3,325,340 | 6/1967 | Walker | 106/DIG. 3 |
| 3,434,917 | 3/1969 | Kraus et al. | 162/3 |
| 3,540,892 | 11/1970 | Lard et al. | 106/15 |
| 3,813,346 | 5/1974 | Wada et al. | 252/378 R |
| 4,144,083 | 3/1979 | Abercrombie, Jr. | 106/288 |
| 4,267,062 | 5/1981 | Byerley | 252/8.55 |
| 4,324,838 | 4/1982 | Ballard et al. | 106/DIG. 3 |
| 4,400,297 | 8/1983 | Cruz, Jr. | 252/378 R |
| 4,655,842 | 4/1987 | Ou et al. | 106/415 |
| 4,746,570 | 5/1988 | Suzaki et al. | 106/DIG. 3 |
| 4,786,147 | 10/1988 | Ou et al. | 106/415 |
| 4,801,403 | 1/1989 | Lu et al. | 106/DIG. 3 |
| 4,851,021 | 7/1989 | Bohrn et al. | 106/DIG. 3 |
| 4,956,121 | 9/1990 | Tymon et al. | 106/DIG. 3 |

FOREIGN PATENT DOCUMENTS

| | | | |
|---|---|---|---|
| 55844/80 | 9/1980 | Australia . | |
| 82/01682 | 6/1983 | PCT Int'l Appl. | 33/02 |
| 1593383 | 7/1981 | United Kingdom . | |

Primary Examiner—William R. Dixon, Jr.
Assistant Examiner—Scott L. Hertzog
Attorney, Agent, or Firm—John J. Wasatonic; William L. Baker

[57] ABSTRACT

Stable vermiculite dispersions which are substantially free of settling and a method of preparing same are provided. The dispersions are obtained by treating the vermiculite platelets of which the dispersion is comprised with an anionic chelating agent. The anionic chelating agent enhances the rate and degree of swelling of the vermiculite in an aqueous medium. The swollen vermiculite is delaminated by shearing to provide the inventive dispersions.

22 Claims, No Drawings

VERMICULITE DISPERSIONS AND METHOD OF PREPARING SAME

BACKGROUND OF INVENTION

This application is a continuation-in-part of U.S. application Ser. No. 261,880, filed Oct. 24, 1988, now abandoned which is a continuation-in-part of U.S. application Ser. No. 027,731 filed Mar. 19, 1987, now U.S. Pat. No. 4,780,147, which is a continuation-in-part of U.S. application Ser. No. 764,910, filed Aug. 12, 1985, now U.S. Pat. No. 4,655,842.

This invention relates to delaminated vermiculite dispersions and a method of producing same.

The term vermiculite refers to the group of rock forming mineral species characterized by a layer latticed structure in which the silicate layer units have a thickness of approximately 10 Å. The main elements present in the layer are magnesium, aluminum, silica and oxygen with the layers being separated by 1 or 2 sheets of water molecules associated with cations such as magnesium, calcium sodium and hydrogen. The layers have considerable lateral extent relative to the thickness of the basic 10 Å unit layer. The term vermiculite as used herein therefore includes minerals consisting wholly or largely of vermiculite, or minerals of a mixed-layer type containing vermiculite layers as an important constituent, such as hydrobiotites, and chlorite-vermiculite, but does not include minerals of the montmorillonite group.

U.S. Pat. No. 3,325,340 to G. Walker describes the production of dispersions of delaminated vermiculite and the production or films and coating therefrom. The patent discloses that the dispersions can be prepared by treating vermiculite crystal with a solution containing a cation which can diffuse between the interlayers of the crystal's mineral structure and cause gross swelling in a direction normal to the main cleavage plane of the layer during immersion in water, immersing the treated vermiculite in water and permitting the swelling to occur, and shearing the swollen vermiculite to delaminate the layers and form a suspension of individual vermiculite flakes or platelets. The swelling of the vermiculite is believed to take place as a result of exchange of the cation of the treatment solution for the exchangeable cations of the vermiculite crystal. This cation exchange weakens the binding forces between the vermiculite platelets and thus allows swelling to occur in the presence of water. With the weakening of the binding forces and the swelling of the vermiculite, the individual platelets can be delaminated from one another under conditions of intense shearing, resulting in an aqueous suspension of the platelets, hereinafter referred to as a vermiculite dispersion.

As agents which can be used to promote the swelling of the vermiculite crystal, U.S. Pat. No. 3,325,340 specifically discloses the chloride salts of the following cations: n-butylammonium; iso-amylammonium; iso-butylammonium; n-propylammonium; the cationic form of amino acids, such as lysine or ornithine, and the lithium cation. The focus of the disclosure of this patent relative to promoting vermiculite swelling is the cation provided by these salts, since cation exchange in integral to effecting the desired swelling and delamination of the vermiculite. The anion provided by the salt used in the vermiculite treatment step is not indicated to be of importance in promoting the swelling of the vermiculite, or to otherwise affect the overall process for producing the dispersion.

As indicated by the above, the salts disclosed by U.S. Pat. No. 3,325,340 for use in the vermiculite treatment step are chloride salts and, in general, the chloride salts have been the predominant materials used in the preparation of vermiculite dispersions. In particular, n-butylammonium chloride and lithum chloride have become widely used for effecting the vermiculite swelling.

It has been observed by the inventors that vermiculite dispersions which are provided by use of conventional swelling agents, such as the chloride salts discussed above, have a number of drawbacks. Those prepared using chloride salts generally contain residual chloride, which is corrosive and thus may be of concern where it is desired to apply the dispersion to various metals. In addition, dispersions produced with the chloride and various other salts tend to be unstable, in that the vermiculite platelets in these dispersions tend to reaggregate after a period of time, e.g., within one to twenty four hours, and settle out of the dispersion. Agitation of the settled dispersion is thus required prior to use and, depending on the degree of reaggregation and settling, vigorous agitation or further shearing may be necessary to regenerate a uniform dispersion. This can engender increased process costs in the use of the dispersion as a result of the additional time, labor, and equipment which may be required.

The production of a stable dispersion in which the vermiculite platelets do not settle on standing would eliminate these costs. Moreover, for forming coatings and films with vermiculite dispersions, a stable dispersion would facilitate and help assure a uniform application of vermiculite platelets to the substrate of choice.

This invention is directed to a process of swelling vermiculite and preparing aqueous vermiculite dispersions from the swollen vermiculite, and to the resultant dispersions. Dispersions which are substantially free of settling can be prepared according to the process of this invention.

In its method aspects, the present invention is directed to the discovery that the chemically induced swelling of vermiculite which occurs using cationic swelling agents, e.g., those disclosed in the aforementioned Walker patent, is substantially enhanced if conducted in the presence of certain anionic chelating agents. More particularly, it has been discovered that the conjuctive use of a cationic vermiculite swelling agent and an anionic chelating agent which is able to form a chelation complex with one or more of the exchangeable metal cations of the vermiculite crystal results in an increased degree of swelling of the crystal, in comparison to that effected by the cationic swelling agent alone. In addition, it has been found that the enhanced swelling caused by the chelating agent results in dispersions of improved quality upon shearing of the swollen vermiculite. Thus, vermiculite dispersions which are substantially free of settling can be obtained. In addition, the use of anionic chelating agents also allows the production of dispersions which are chloride-free, and thus non-corrosive. Thus, in contrast to the prior emphasis on the cation which is exchanged with the vermiculite, the method of this invention relates to the use of a particular anionic species to provide desired improvements in the resultant dispersion.

This invention is accordingly directed in part to a method comprising the steps of treating crystals of vermiculite with (a) a cation which promotes swelling of the crystals in a direction normal to the main cleavage plane of the crystals during immersion in water subsequent to said treatment and (b) an anionic chelating agent which increases the degree of swelling effected by the cation, with the proviso that the chelating agent is not citrate anion; immersing the treated crystals in water; permitting the immersed crystals to swell; and, for the production of vermiculite dispersions, subjecting the resultant swollen crystals while immersed in water to a shearing force to form a dispersion of vermiculite platelets.

As used herein, the term "chelating agent" refers to any compound containing electron donating atoms or groups that can combine by coordinate bonding with any of the exchangeable metal cations of the vermiculite crystal to form a chelation complex. The term "anionic chelating agent" refers to any of the anionic species of the chelating agent which may exist in solution, i.e., any of the partially or completely dissociated species.

Any chelating agent which forms the above-mentioned chelation complex and provides the enhanced swelling of vermiculite may be used in the invention. The chelation agent will generally contain at least one acidic moiety such as a phosphoric, phosphonic, sulfonic, or preferably, carboxylic acid group. Polycarboxylic acids are especially preferred. It is also preferred that the electron donating groups or atoms are spatially positioned to provide a five or six membered ring upon coordinate bonding with the metal cation. In general, such chelating agents are well known (cf. Kirk-Othmer, Encyclopedia of Chemical Technology, 3rd ed., vol. 5, 1979 pp. 339-368) and, in particular, the chelating agents commonly used for the sequestering of magnesium or calcium ions are well known materials that are particularly useful in this invention. Particular chelating agents which can be used are the anions of ethylenediamine tetracetic acid, nitrilotriacetic acid, cyclohexane trans-1,2-diamino tetraacetic acid, lactic acid, oxalic acid tricarballylic acid, and hydroxyethylethylenediamine tetracetic acid.

The chelating agent preferably provides at least a 10% increase in maximum swelling volume, as compared to the swelling effected by the cationic swelling agent alone, and more preferably provides at least a 50% increase in maximum swelling volume.

In a typically conducted process of the invention, the vermiculite crystal is provided as the naturally occurring mineral, i.e., as particles of unexfoliated vermiculite ore. The ore particles are immersed in an aqueous treatment bath containing the anionic chelating agent and a soluble cation capable of exchanging with one or more interlayer cations of the vermiculite lattice and promoting swelling as described above. The treatment bath may be prepared by dissolving in water a chelating agent salt and a salt of the desired cation. Thus, any of the salts taught in U.S. Pat. No. 3,325,340, for example, may be used in the present invention, in conjunction with the use of the chelating agent. Where such a mixture of salts is used, the chelating agent salt need not comprise a cation which can exchange with the vermiculite to promote swelling.

A common solution of both salts can be prepared and used to treat the vermiculite, i.e., the vermiculite is immersed in the solution and thus exposed to both ionic moieties simultaneously. Alternatively, the vermiculite may be treated sequentially with the ions, either by use of separate salt solutions or by later addition of one of the salts to a single treatment bath. It is generally preferred to employ treatment baths in which the cation concentration is at least 0.2N.

Rather than using individual salts of the cation and chelating agent, a water soluble chelating agent salt of a cation which can exchange with vermiculite to promote swelling can be used. In general, such a chelating agent salt will be the only swelling agent which is used to treat the vermiculite, although conventional swelling agents may also be present, if desired, in the treatment bath. The chelating agent salt of any of the cations known to undergo exchange with one or more of the interlayer cations of vermiculite so as to promote swelling in the manner described above may be used in this invention, e.g., alkylammonium salts having 3 to 6 carbon atoms in each alkyl group, the salts of amino acids, or, preferably, lithium salts of the chelating agent.

The anionic chelating agent can also be generated in situ in the treatment bath through the reaction of acidic groups on the chelating agent with a basic group capable of dissociating the acid. The basic group may be provided by addition of a separate base such as hydroxide to the treatment bath or as the anion of a salt of the cationic exchanging agent.

The concentration of anionic chelating agent which can be used in the treatment bath is in the range of about 0.2N up to a saturation concentration. Where the anionic chelating agent is used in association with a salt which is capable of promoting swelling of vermiculite, a lower concentration, e.g., 0.02N to 0.20N may be suitable to enhance the swelling and provide a stable dispersion. Where a chelating agent salt of an exchangeable cation is used as the sole swelling agent, it is preferred to use a higher concentration in the range of about 0.5N up to a saturation concentration. A preferred range of anionic chelating agent concentration is about 0.5N to 4N.

The vermiculite can usually be treated satisfactorily with the anionic chelating agent and the exchangeable cation by immersion in a bath containing these ions for about 2 to 24 hours at room temperature with occasional stirring. This process can, however, be accelerated by more vigorous stirring or the application of heat. After completion of the treatment step, the ore is separated from the bulk of the treatment bath, e.g., by filtration or decantation. The treated ore is then immersed in water which is substantially free of electrolyte so as to create an electrolyte concentration gradient between the interior of the vermiculite ore particles and the surrounding medium. This gradient is believed to generate osmotic pressures which cause separation or partial delamination of the individual layers of the vermiculite and overall swelling of the ore particle.

Generally, the treated vermiculite particles are immersed in water for about 5 to 15 minutes at room temperature, the water decanted, and a quantity of fresh water added, and this process is repeated several times to achieve maximum swelling and the removal of substantially all of the ions in solution.

It has been found that the swelling begins almost instantaneously and that the maximum volume can be reached in an exceedingly short period of time, e.g., less than one hour. This may be contrasted with the swelling time to reach maximum volume of at least several hours observed with conventional swelling agents such as lithium chloride or n-butylammonium chloride.

The enhanced rate of swelling is obviously of advantage in minimizing the amount of time necessary to complete the preparative process. The increased degree of swelling is believed to facilitate the subsequent delamination of the vermiculite and the formation of a higher concentration of relatively thin platelets. The stability of the resultant dispersions and an enhanced degree of adhesiveness and cohesiveness observed in the resultant dispersions may, in part, be attributable to this higher concentration of thin platelets.

Subsequent to swelling, the final rinse bath is separated from the vermiculite and sufficient water is added to bring the vermiculite solids concentration to a desired level. The concentration may also be adjusted by addition or removal of water after delamination. Although the dispersions can be prepared to a vermiculite solids weight concentration of up to 20%, concentrations of less than 15% are normally preferred in order to attain a sufficiently low viscosity permitting easy handling and use. Weight concentrations in the range of about 4% to 12% are preferred, more preferably about 5% to 10%.

The delamination of the swollen vermiculite may be effected by the conventional means of high speed shearing which have been previously used, e.g., colloid mills, high speed blenders, homogenizers, and the like.

As indicated above, the cohesive and adhesive properties of the dispersions of this invention may exceed those of dispersions prepared similarly with a conventional swelling agent. The dispersions can be used to prepare films having a tensile strength of at least about 3000 psi and, generally, in the range of about 3000 psi to 12,000 psi. Preferred films are those having a tensile strength of at least about 7000 psi. The tensile strengths described herein refer to those measured by pulling oven-dried films in the direction of draw down of the dispersion at a rate of 0.5 in./min.

Insofar as the present invention provides an enhanced rate or degree of vermiculite swelling, or improved stability, adhesiveness, or cohesiveness in the vermiculite dispersions, it should be understood that the degree of improvement which is obtained may vary with the geographic origin of the vermiculite ore.

The dispersions of this invention can be used in any application for which vermiculite dispersions in general have been known. The dispersions can be used in the making of non-burning papers, e.g., as disclosed in U.S. Pat. Nos. 3,434,917 and 3,654,073 and in the published report of the Closed Systems Division of the National Aeronautic and Space Administration entitled "Development of Inorganic Nonflammable Vermiculite Flight Paper", Contract NAS 9-7782, published in 1969. The dispersions of this invention can also be used to form fireproofing coatings on combustible materials such as cellulose fibers, as disclosed, for example, in U.S. Pat. No. 3,540,892, and non-combustible fibers to upgrade their fire and heat resistance, e.g., as in U.S. Pat. No. 3,654,073.

A coating of the lamallae may be prepared by applying the dispersion to a substrate and removing the aqueous carrier, e.g., by evaporation. The substrate may be in any suitable form such as an individual fiber, a sheet, a woven or non-woven mat or a block. The substrate may be a combustible material, e.g., a cellulosic fiber material or a naturally occurring or synthetic organic polymer, or a non-combustible material such as glass, fiberglass, or metal. If the substrate is porous to the dispersion, as with most fiberglass mats, for example, the coating may derive from impregnation of the substrate. The dispersions may also be used as binder layers in laminates, either alone or in conjunction with an additional binder material.

Coatings prepared from the dispersions of this invention may display improved bonding to the substrate as a result of the increased adhesiveness of the dispersion deriving rom the use of the anionic chelating agent. In those applications where the dispersion also serves a binding function, such as in papers and impregnated fibrous mats, greater tear strengths or tensile strengths may be obtained, deriving from the improved properties of the dispersion. Similarily, laminates containing layers of the dispersion as an adhesive may have greater integrity and strength, and a lesser tendency to delaminate under conditions of use.

The dispersions of this invention may also be coated onto a support, dried, and removed therefrom to provide a self-supporting film of vermiculite lamallae. These films have enhanced strength and may be used, for example, as fireproof facings on a variety of substrates.

The present invention is further described by the following Examples, which are illustrative only and not intended to be of limiting effect.

EXAMPLE 1

A 3.0N solution of tetralithium ethylenediamine tetraacetic acid (Li-EDTA) was prepared by slowly adding 473 grams of EDTA (free acid form) to 239 grams of lithium carbonate in one kilogram of deionized water. After foaming had subsided, two kilograms of deionized water were added.

To the 3.0N Li-EDTA solution were added 2.16 kilograms of No. 4 grade vermiculite from South Carolina. The mixture was stirred and then allowed to stand for 24 hours at room temperature. The resultant slurry was then filtered and rinsed with approximately 7 liters of water. The filter cake was then placed in deionized water and allowed to swell for approximately 25 minutes with agitation. The lighter weight swollen vermiculite was separated from heavier rock-like particles by collection of the vermiculite from the upper section of the swelling vessel and the collected slurry was concentrated by filtration. The concentrated slurry was sheared with the APV homogenizer at 3000 psi. A stable dispersion was obtained which displayed virtually no settling after standing for one month.

Films were prepared by drawing down the dispersion on a granite surface using a draw down bar set at 30 mils thickness and drying the deposited film at room temperature overnight. The dried films were cut into strips and dried at 60° C. in a convection oven. The tensile strength of each strip was measured on an Instron set in the 0 to 20 pound range and at a cross speed of 0.5 inches per minute. The measured average tensile strength (10 samples) was 3158 psi.

These films showed a decrease in tensile strength upon exposure to ambient atmospheric conditions.

EXAMPLE 2

A 1N Li-EDTA solution was prepared by slowly adding 73.06 grams of technical grade EDTA to a stirred aqueous slurry of reagent grade lithium carbonate and, after complete addition of the EDTA, adding sufficient water to bring the total volume to one liter.

A 1N solution of Li-CDTA (tetralithium cyclohexane trans-1,2-diamino tetracetic acid) was similarly prepared.

A 3N solution of lithium citrate was prepared by slowly adding 384.3 grams of Miles Laboratories 50% w/w citric acid to a stirred aqueous slurry of reagent grade lithium carbonate and, after complete additional of the citric acid, adding sufficient water to bring the total volume to one liter. 3N solutions of lithium neutralized lactic acid, oxalic acid, and tricarballylic acid were similarly prepared.

A quantitative comparison of the swelling of vermiculite ore in the above chelating agent solutions was conducted by adding 50 grams of No. 4 grade South Carolina vermiculite to 50 ml. and 100 ml. of the Li-EDTA, Li-CDTA, lithium citrate, and lithium oxalate solutions and to 50 ml. of the lithium lactate and lithium tricarballylate solutions. For comparison, 50 grams of the vermiculite was also added to 50 ml. of a 3N lithium chloride solution. After adding the vermiculite, each mixture was stirred and then allowed to soak overnight. The mixtures were then dewatered by vacuum filtration using Whatman #40 filter paper, the ore washed once with about 20 ml. of water, and transferred to a 2000 ml. graduated cylinder. Approximately 500 ml. of water was added, the cylinder covered, and then inverted ten times. After five minutes, the water was decanted, another 500 ml. added and the procedure repeated. After again decanting, the cylinder was filled to the two liter mark, inverted ten times, and allowed to stand for 24 hours. The volumes of the swollen vermiculite samples in the cylinder were then noted and are given below in TABLE 1.

TABLE 1

| Chelating Agent Solution | Volume of Chelating Agent Solution (ml.) | 24 Hour Swelling Volume (ml.) |
|---|---|---|
| 1N Li-CDTA | 100 | 680 |
| 1N Li-EDTA | 100 | 670 |
| 1N Li-CDTA | 50 | 660 |
| 1N Li-EDTA | 50 | 640 |
| 3N Li Citrate | 100 | 615 |
| 3N Li Citrate | 50 | 535 |
| 3N Li Tricarballylate | 50 | 375 |
| 3N Li Lactate | 50 | 305 |
| 3N Li Cl | 50 | 265 |
| 3N Li Oxalate | 100 | 225 |

Especially good swelling results were observed using the EDTA, CDTA, and citrate swelling agents, and all chelating agents other than oxalate showed improvement over lithium chloride. It is noted that lithium oxalate is only soluble in water up to concentrations of 1.5N and a considerable amount of precipitate was observed in the 3N solution. This resulted in a high ion concentration which apparently necessitates additional rinsing beyond that used in order to achieve the maximum potential swelling volume.

What is claimed is:

1. A process for preparing aqueous vermiculite dispersions comprising the steps of:
   treating vermiculite crystals with (a) a cation which promotes swelling of said crystals in a direction normal to the main cleavage plane of said crystals during immersion in water subsequent to said treatment and (b) an anionic chelating agent which increases the degree of swelling effected by said cation, with the proviso that said chelating agent is not citrate anion;
   immersing the treated crystals in water;
   permitting the immersed crystals to swell; and
   subjecting the resultant swollen crystals while immersed in water to a shearing force to delaminate the vermiculite crystal and form a suspension of delaminated vermiculite platelets.

2. A process of claim 1 wherein said vermiculite is treated by immersion in an aqueous treatment bath containing a solubilized salt of said anionic chelating agent and a solubilized salt of said cation.

3. A process of claim 1 wherein said cation is selected from the group consisting on N-alkylammonium cations having 3 to 6 carbon atoms inclusive in each alkyl group, the cationic form of an amino acid, and lithium cation.

4. A process of claim 1 wherein said cation is lithium cation.

5. A process of claim 1 wherein said vermiculite is treated by immersion in an aqueous treatment bath containing a solubilized chelating agent salt of said cation.

6. A process of claim 5 wherein said cation is a lithium.

7. A process of claim 1 wherein said vermiculite is treated simultaneously with said anionic chelating agent and said cation.

8. A process of claim 1 wherein said vermiculite is treated by immersion in a treatment bath comprising said anionic chelation agent in a concentration in the range of about 0.02N up to a saturation concentration.

9. A process of claim 8 wherein the concentration of said anionic chelating agent is in the range of about 0.5N to 4N.

10. A process of claim 5 wherein the concentration of said chelating agent salt is in the range of about 0.5N up to a saturation concentration.

11. A process of claim 10 wherein the concentration of said chelating agent salt is in the range of about 0.5N to 4N.

12. A process of claim 1 wherein the weight concentration of vermiculite platelets in the dispersion formed by shearing said swollen vermiculite is less than about 15% based on the weight of the dispersion.

13. A process of claim 12 wherein the weight concentration of vermiculite platelets is in the range of about 4% to 12%.

14. A vermiculite dispersion prepared by the process of claim 1.

15. A process for preparing a stable dispersion of vermiculite platelets which comprises contacting said platelets with an anionic chelating agent to substantially prevent the settling out of said platelets from said dispersion, with the proviso that said chelating agent is not citrate anion.

16. A process of claim 1 wherein said chelating agent contains at least one acidic moiety.

17. A process of claim 16 wherein said chelating agent contains at least one phosphoric, phosphonic, sulfonic, or carboxylic acid group.

18. A process of claim 16 wherein said chelating agent is a polycarboxylic acid.

19. A process of claim 1 wherein said chelating agent is selected from the group consisting of the anions of ethylenediamine tetracetic acid, nitrilotriacetic acid, cyclohexane trans-1,2-diaminotetracetic acid, lactic acid, oxalic acid, tricarballylic acid, and hydroxyethylethylenediamine tetracetic acid.

20. A process of claim 1 wherein said chelating agent is ethylenediamine tetracetic acid.

21. A process of claim 1 wherein said chelating agent is capable of sequestering magnesium or calcium ions.

22. A process for increasing the degree of swelling of vermiculite ore particles comprising the steps of:
   treating vermiculite ore particles with (a) a cation which promotes swelling of said particles in a direction normal to the main cleavage plane of said particles during immersion in water subsequent to said treatment and (b) an anionic chelating agent which increases the degree of swelling effected by said cation, with the proviso that said chelating agent is not citrate anion;
   immersing the treated particles in water; and
   permitting the immersed particles to swell.

* * * * *